United States Patent [19]

Mathwig

[11] 4,085,491
[45] Apr. 25, 1978

[54] SOLAR ENERGY HEAT EXCHANGER AND METHOD FOR MAKING SAME

[76] Inventor: Richard G. Mathwig, 2218 E. Evergreen, Mesa, Ariz. 85203

[21] Appl. No.: 662,362

[22] Filed: Mar. 1, 1976

[51] Int. Cl.² .............................................. B23P 15/26
[52] U.S. Cl. ............................ 29/157.3 AH; 165/184
[58] Field of Search ............... 29/157.3 AH, 202 D; 113/118 A; 165/184

[56] References Cited

U.S. PATENT DOCUMENTS

| | | | |
|---|---|---|---|
| 1,032,925 | 7/1912 | Miller | 29/157.3 AH |
| 2,604,138 | 7/1952 | Harrison | 29/157.3 AH |
| 2,763,470 | 9/1956 | Certain | 165/184 |
| 2,779,383 | 1/1957 | Johnson | 29/202 D |
| 2,812,794 | 11/1957 | Chapman | 165/184 |
| 2,865,424 | 12/1958 | McElroy | 29/157.3 AH |
| 3,519,070 | 7/1970 | Bappler | 29/157.3 AH |
| 3,568,288 | 3/1971 | Nihlen | 29/157.3 AH |
| 3,773,241 | 11/1973 | Norris | 29/157.3 AH |

Primary Examiner—C.W. Lanham
Assistant Examiner—Daniel C. Crane
Attorney, Agent, or Firm—Cahill, Sutton & Thomas

[57] ABSTRACT

A fluted strip of heat conducting material is spirally wound edgewise about a length of pipe and, in combination, define a heat exchanger for receiving solar energy. The lateral edges of the flutes forming the outer edge of the strip define an undulating line superimposed upon a helix. The lateral edges of the flutes forming the inner edge of the strip define an undulating line superimposed upon a sinusoidal curve which, in turn, is superimposed upon a helix. Thereby, cyclically repetitive ones of the flutes become oriented normal to the rays of the sun to effect maximum heat transfer as the angle of incidence to the heat exchanger varies. A method for producing the heat exchanger is also described.

1 Claim, 6 Drawing Figures

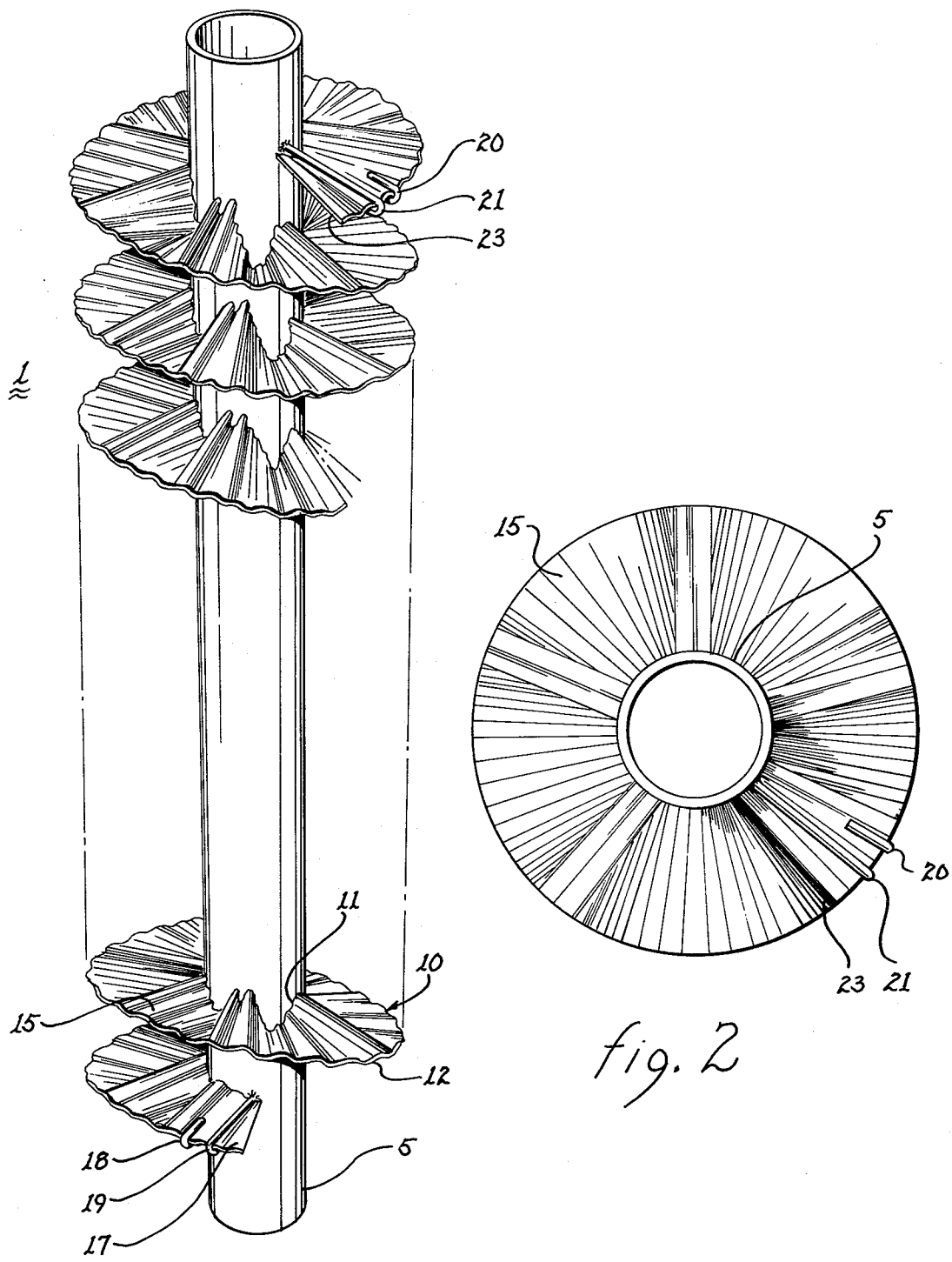

SOLAR ENERGY HEAT EXCHANGER AND METHOD FOR MAKING SAME

The present invention relates to heat exchangers, and, more particularly, to heat exchangers for receiving solar energy.

The employment of fins extending laterally from a fluid conducting pipe for dissipating heat is well known. Moreover, it is well known to employ heat exchangers wherein a flange is spirally located about a circular pipe. To increase the flange surface area for greater heat dissipation, the area in contact with the circumscribed pipe has been convoluted, but the convolutions have not extended across the full width of the flange. The following United States patents are representative of known, related prior art devices: U.S. Pat. Nos. 242,300; 682,649; 1,395,618; 1,734,136; 1,972,230; 2,117,445; 2,532,239; and 2,613,066. U.S. Pat. No. 1,840,317 describes a method for developing and spirally winding a flange about a length of pipe.

In order to utilize solar energy efficiently, the collecting surface should be maintained perpendicular to the incoming rays of sunlight. Very expensive heat collectors incorporate tracking mechanisms to maintain the collecting surfaces perpendicular to the sun's rays, but such mechanisms are extremely expensive and are limited to scientific and experimental devices.

For home consumption and general commercial use, a solar heat collector must be relatively inexpensive and yet be able to maximize collection of the heat content of the sun's rays impinging upon the collector. Moreover, the size and configuration of the collector must be oriented to the attendant heating purpose and installation must be relatively simple and uncomplicated to permit deployment by low-skilled labor and minimize the attendant installation costs.

It is therefore a primary object of the present invention to provide a solar energy heat exchanger which includes a plurality of collection surfaces near perpendicular to the impinging sun's rays regardless of the orientation of the heat exchanger with respect to the sun.

Another object of the present invention is to provide a solar energy heat exchanger which may be oriented vertically, horizontally or at any angle.

Yet another object of the present invention is to provide a solar energy heat exchanger for efficiently absorbing the heat of the sun's rays.

Still another object of the present invention is to provide an inexpensive solar energy heat exchanger.

A further object of the present invention is to provide a solar energy heat exchanger which may be accurately mounted by low-skilled workmen.

A still further object of the present invention is to provide a means for manufacturing a solar energy heat exchanger having a plurality of cyclically repetitively oriented collection surfaces.

A yet further object of the present invention is to provide a means for winding a fluted strip about a pipe, the edges of which strip define complex wave forms superimposed upon a helix.

These and other objects of the present invention will become apparent to those skilled in the art as the description thereof proceeds.

The present invention may be described with greater specificity and clarity with reference to the following drawings, in which:

FIG. 1 is an isometric view of the solar energy heat exchanger.

FIG. 2 is an end view of the solar energy heat exchanger and depicting a cyclically varying orientation of adjacent flutes within the spirally wrapped strip.

Figure 3:
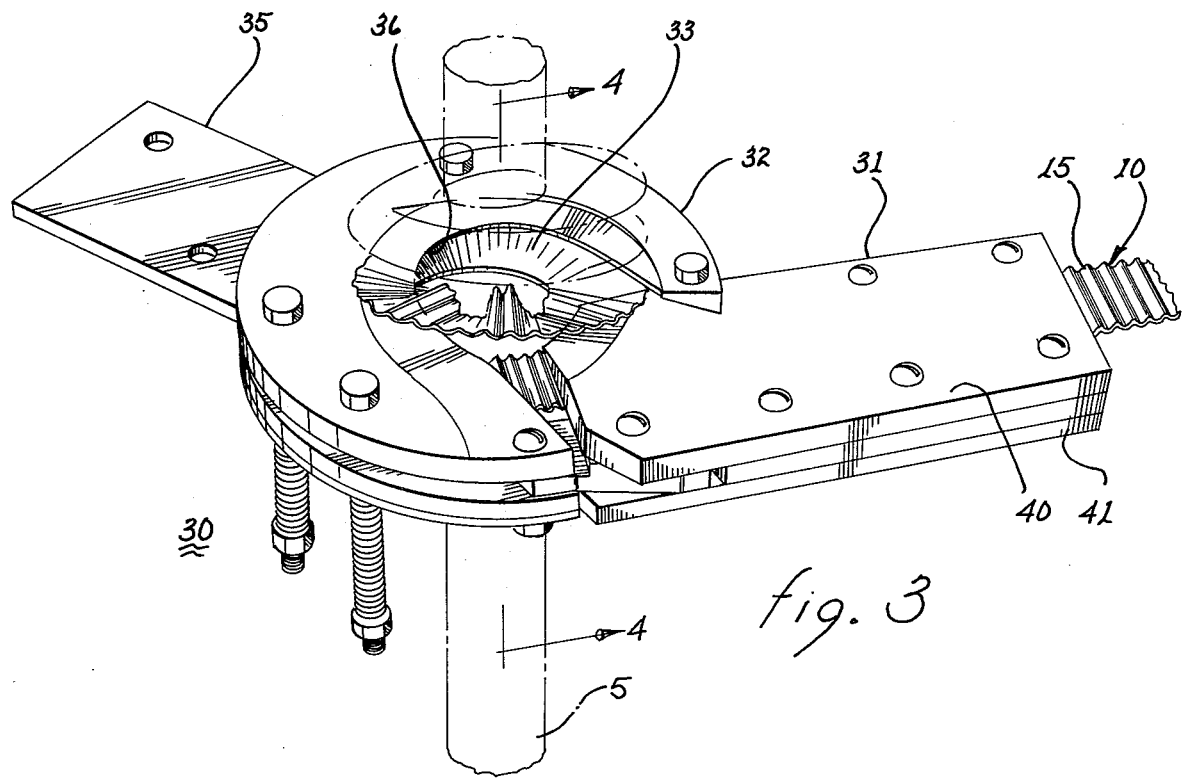
FIG. 3 is an isometric view of a machine for producing the solar energy exchanger.

Solar energy heat exchanger 1 will be described with primary reference to FIGS. 1 and 2. Pipe 5 is of copper or other material having relatively good heat conducting properties and conveys the fluid to be heated. A fluted strip 10 is spirally wrapped about pipe 5 with longitudinal edge 11 being essentially in contact with the surface of the pipe and longitudinal edge 12 being positioned regularly outward from the pipe.

Before strip 10 is wrapped about pipe 5, the strip is crimped to produce a plurality of transversely oriented near planar flutes, such as flute 15. On wrapping of the fluted strip about pipe 5, inner edge 11 is caused to assume a generally sinusoidal-like wave form centered upon the helix defined by the wrapped strip. As the strip is transversely fluted, the lateral edge of each flute defining a part of edge 11 is angularly displaced from the lateral edges of adjacent flutes. These lateral edges, in combination, define a convolution superimposed upon the helix-oriented sinusoidal wave form. Outer edge 12 generally defines a helix because of the spirally wound strip. However, the lateral edges of the flutes forming edge 12 are angularly displaced from one another. Hence, these lateral edges, in combination, define convolutions superimposed upon a helix.

End 17 of strip 10 is supported by and mechanically or bondingly attached to pipe 5 by means of stanchions 18 and 19, extending from the pipe. Similar stanchions 20 and 21 extend from the pipe 5 to supportingly engage end 23 of strip 10. It has been found that edge 11 need not be bonded to pipe 5 intermediate ends 17 and 23. That is, the inherent structural rigidity of the spirally wrapped strip essentially precludes displacement thereof along pipe 5 during normal handling. Further, edge 11 is essentially in continuous contact with the circumscribed surface of pipe 5 resulting in a sufficiently good heat transfer to render unnecessary additional bonding for the purpose of conducting heat to a pipe. From tests it has been learned that the effective heat transfer from the strip to the pipe is in the range of eighty to eighty-five percent (80–85%) of the heat collected by the strip.

As particularly illustrated in FIG. 2, the rectangularly shaped and near planar flutes are angularly oriented with respect to one another. The angular orientation is further modified by the complex wave form defined by edges 11 and 12 such that periodic ones of flutes 15 will be essentially perpendicular to almost any point source of radiant energy, such as the sun. Hence, as the angular orientation between the heat exchanger and the sun varies per time, one or another flute within a set of flutes 15 will be always oriented essentially perpendicular to the impinging sun rays. Those flutes or sets of flutes which are not perpendicularly oriented to the rays of the sun will also, but to a lesser degree, receive and collect heat from the sun. As is well known, the heat generated within strip 15 is conducted to pipe 5 for ultimate transfer to the fluid flowing within a pipe.

Figure 4:
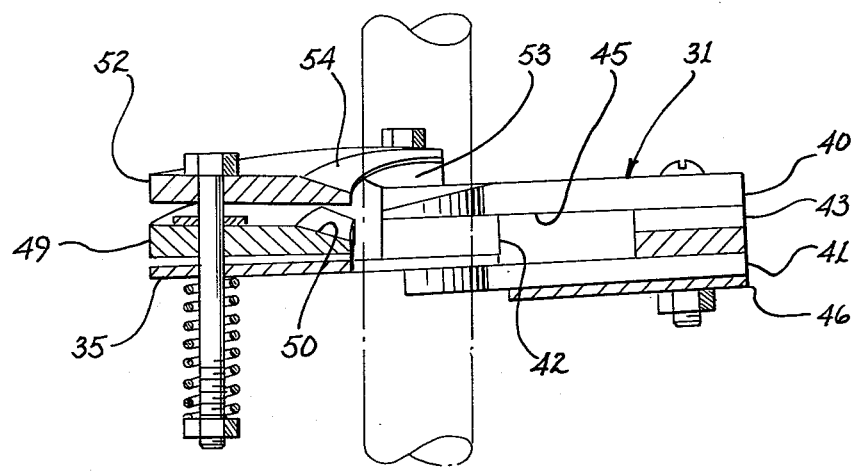
FIG. 4 is a section view taken along lines 4-4, as shown in FIG. 3.
Figure 5:
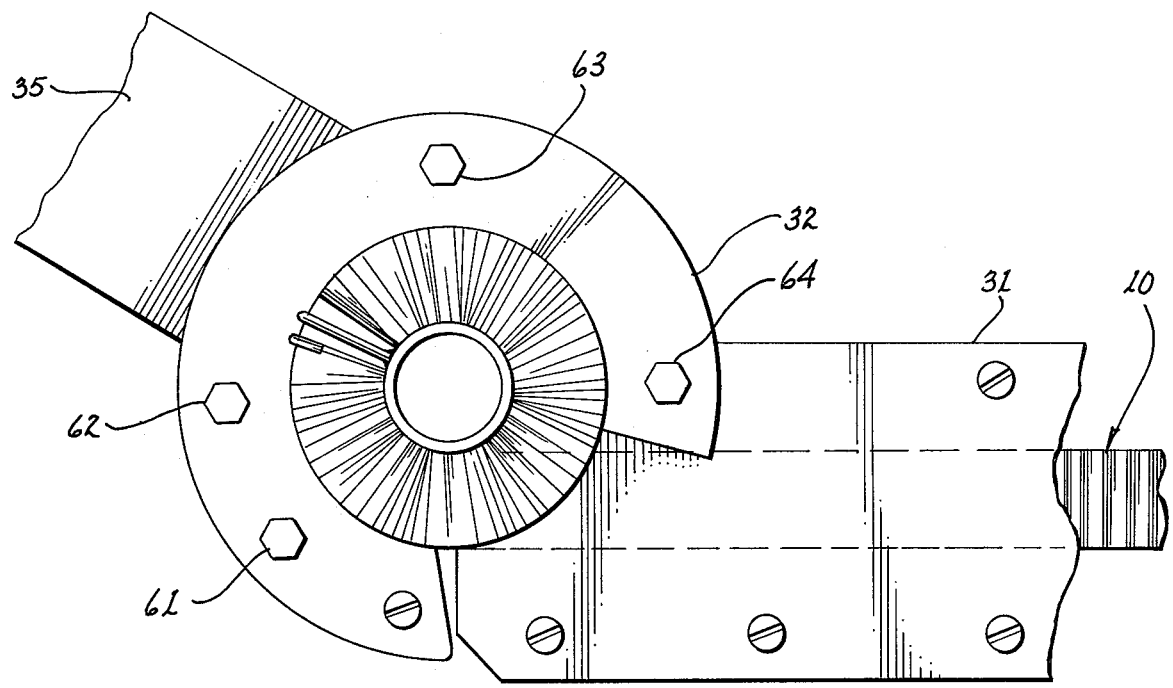
FIG. 5 is a top view of the machine.
Figure 6:
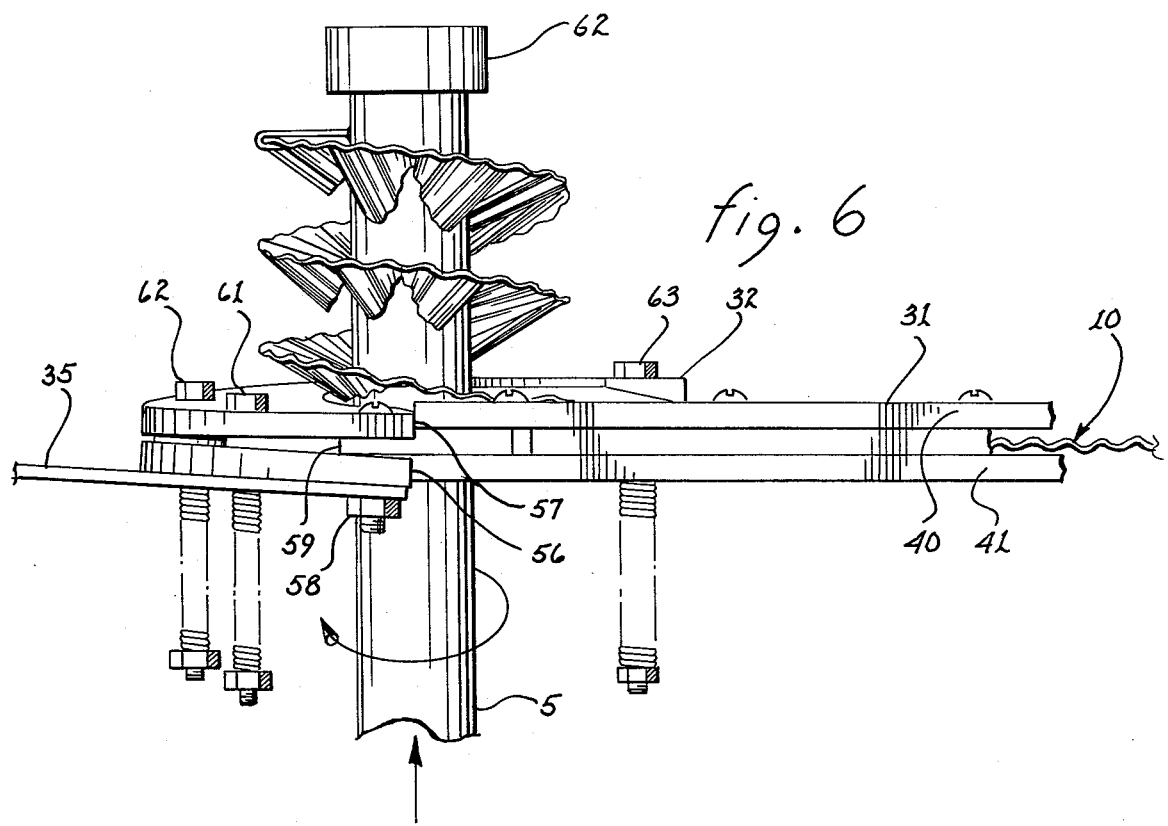
FIG. 6 is a side view of the machine, indicating the movement of the pipe therethrough.

Referring to FIGS. 3, 4, 5 and 6, the structural details of machine 30 and the method for manufacturing heat exchanger 1 will be discussed. Housing 31 includes a top plate 40, a bottom plate 41 and a pair of spacers 42 and 43 sandwiched therebetween. The combination of plates and spacers define feed chute 45 which is essentially rectangular in cross-section to accommodate the width and breadth of strip 10. A supporting plateform 46, mechanically attached to a platform 35, provides structural rigidity to housing 31. Receiver 32 is formed by an open-ended annular plate 49 defining an aperture 36 supported upon platform 35. The upper surface 50 of plate 49 in proximity to aperture 36 is beveled to define a part of cavity 33. A second open ended annular plate 52 is positioned above and generally coincident with plate 49. The lower surface 45 of plate 52 in proximity to aperture 36 is beveled to define another part of cavity 33. In addition, the upper surface 54 of plate 52 in proximity to aperture 36 is beveled to serve as a guide in aiding in the spiral development of strip 10. Ends 56 and 57 of plates 49 and 52, respectively, are secured by nut and bolt means 58 but vertically displaced from one another by means of spacer 59. A plurality of spring loaded nut and bolt combinations 61, 62, 63 and 64, yieldingly retain the plates adjacent one another and in alignment with platform 35.

To manufacture heat exchanger 1, crimped strip 10, having parallel transversely oriented rectangular planar surfaces or flutes 15, is fed into feed chute 45 within housing 31. The strip is discharged from housing 31 into a beveled annular spirally oriented cavity 33 disposed within receiver 32. A radial cross-section of cavity 33 resembles that of a horizontal "V" with the opening of the "V" being oriented toward aperture 36. Pipe 5, about which strip 10 is to be wound, is penetratingly disposed within a circular aperture 36 of receiver 32 and attached to machine tool 62 (see FIG. 6). The machine tool, on energization, simultaneously rotates pipe 5 and draws the pipe toward it, as indicated by the arrows.

To attach strip 10 to pipe 5, a length of strip 10 is forced through feed chute 45 and through cavity 33 until it protrudes therefrom. The protruding end is attached to pipe 5 by means of the stanchions, as described above. By energizing machine tool 62 to rotate and draw pipe 5, strip 10 is caused to be drawn through the feed chute within housing 31, through cavity 33 and become wrapped about the pipe. The simultaneous rotation and pulling of the pipe through aperture 36, the wrapped strip will assume a spiral configuration about the pipe. Once the length of the heat exchanger has been achieved, the wrapped strip is attached to pipe 5 by means such as the stanchions discussed above and then served.

As strip 10 is forced through cavity 33, edge 12 is prevented from becoming undulating by the apex of the "V" but the apex is of sufficient width to accommodate the convolutions of the edge. Edge 11 is encouraged to become sinusoidally undulating to the extent of excursion allowed by the width of the "V" in proximity to aperture 36. By these accommodations within the cavity, the angular orientation between adjacent lateral edges of flutes is preserved. Thus, the flutes remain essentially planar surfaces which are sequentially, angularly repetitively-oriented and a given number of flutes define a complete cycle of surface orientations with the angular orientation of each flute therein being different from other flutes. It may also be noted that the angular differences exist in two orthogonal planes. Hence, at least one flute within a cycle of flutes is perpendicular or near perpendicular to any impinging rays of the sun.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. A method for manufacturing a heat exchanger from a fluted strip and a pipe, said method comprising the steps of:
    a. introducing the fluted strip through a feed chute;
    b. supporting the pipe within an aperture;
    c. guiding the strip from the feed chute through a spiral trough within the aperture and disposed about the supported pipe;
    d. securing the beginning of the strip to the pipe with at least one stanchion;
    e. simultaneously rotating and translating the pipe to draw the strip through the feed chute and trough and spirally wind the strip about the pipe;
    f. forming the flutes along one edge of the strip to define a line generally representative of a first sinusoidal curve superimposed upon a helix;
    g. forming simultaneous with step (f) the sinusoidal flutes along another edge of the strip to define a line generally representative of a second sinusoidal curve superimposed upon a helix;
    h. attaching the terminal end of the strip to the pipe with at least one stanchion.

* * * * *